(12) United States Patent
Yonezawa

(10) Patent No.: US 10,055,052 B2
(45) Date of Patent: Aug. 21, 2018

(54) OPERATION APPARATUS, AND IMAGE PICKUP APPARATUS AND PERSONAL DIGITAL ASSISTANT INCLUDING SAME

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/170,353

(22) Filed: Jun. 1, 2016

(65) Prior Publication Data
US 2016/0360099 A1    Dec. 8, 2016

(30) Foreign Application Priority Data
Jun. 5, 2015    (JP) .................. 2015-114977

(51) Int. Cl.
| H04N 5/232 | (2006.01) |
| H04N 1/00 | (2006.01) |
| G06F 3/041 | (2006.01) |
| G06F 3/044 | (2006.01) |
| G06F 3/01 | (2006.01) |

(52) U.S. Cl.
CPC .......... *G06F 3/0416* (2013.01); *G06F 3/016* (2013.01); *G06F 3/044* (2013.01); *H04N 1/00392* (2013.01); *H04N 1/00411* (2013.01); *H04N 5/23293* (2013.01); *G06F 2203/04105* (2013.01)

(58) Field of Classification Search
CPC .......... H04N 1/00392; H04N 1/00411; H04N 5/23293; G06F 3/016; G06F 3/0416
See application file for complete search history.

(56) References Cited

U.S. PATENT DOCUMENTS

| 6,760,074 | B1 * | 7/2004 | Maruyama | G06F 1/1626 348/333.01 |
| 8,547,339 | B2 * | 10/2013 | Ciesla | G06F 3/0202 345/156 |
| 8,780,060 | B2 * | 7/2014 | Maschmeyer | G06F 3/016 345/173 |
| 2005/0030292 | A1 * | 2/2005 | Diederiks | G09B 21/003 345/173 |
| 2005/0057528 | A1 * | 3/2005 | Kleen | G06F 3/016 345/173 |

(Continued)

FOREIGN PATENT DOCUMENTS

JP        2011508935 A    3/2011

*Primary Examiner* — Daniel M Pasiewicz
(74) *Attorney, Agent, or Firm* — Rossi, Kimms & McDowell LLP

(57) ABSTRACT

An operation apparatus includes: a detector capable of detecting a slide operation on a surface of the operation apparatus; a shape variator including a variable shape portion which is disposed in a partial region of the surface and whose surface shape is deformable; and a controller which controls the shape variator in such a way that the shape variable portion is formed into a first shape being the same as a surface shape of a region other than the partial region or a second shape different from the first shape. The controller controls the shape variator in such a way that the shape of the variable shape portion is formed into the first shape when the detector detects the slide operation.

19 Claims, 5 Drawing Sheets

(56) References Cited

U.S. PATENT DOCUMENTS

| | | | |
|---|---|---|---|
| 2007/0096594 A1* | 5/2007 | Maruyama | G06F 3/011 310/317 |
| 2007/0229233 A1* | 10/2007 | Dort | G06F 3/016 340/407.1 |
| 2008/0024459 A1* | 1/2008 | Poupyrev | G06F 3/016 345/173 |
| 2009/0195512 A1* | 8/2009 | Pettersson | G06F 3/016 345/173 |
| 2009/0250267 A1* | 10/2009 | Heubel | G06F 3/016 178/18.03 |
| 2010/0134433 A1* | 6/2010 | Miyanishi | G03B 19/00 345/173 |
| 2010/0162109 A1* | 6/2010 | Chatterjee | G06F 3/016 715/702 |
| 2011/0254672 A1* | 10/2011 | Ciesla | G06F 3/016 340/407.2 |

* cited by examiner

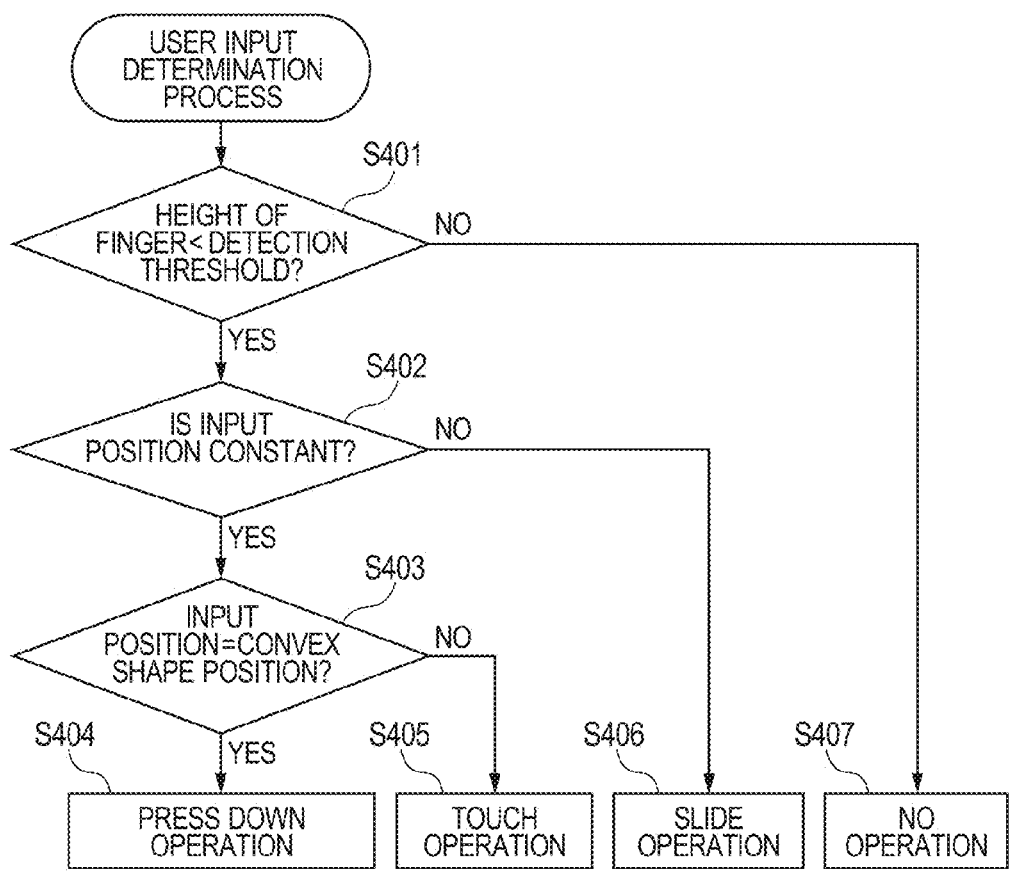
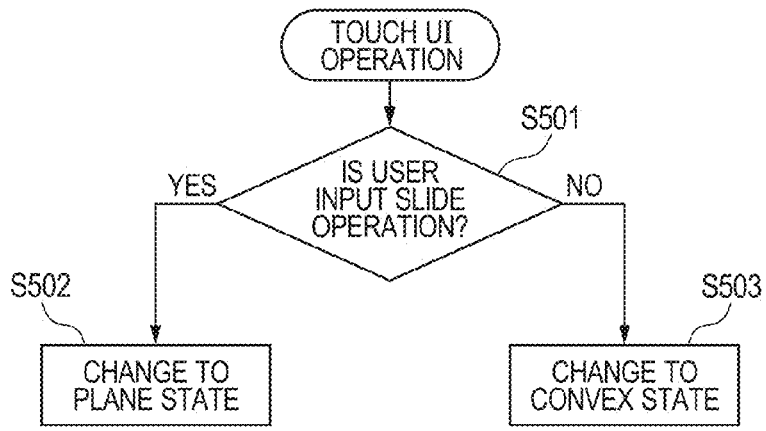

OPERATION APPARATUS, AND IMAGE PICKUP APPARATUS AND PERSONAL DIGITAL ASSISTANT INCLUDING SAME

BACKGROUND OF THE INVENTION

Field of the Invention

The present invention relates to an operation apparatus, or more specifically, to an operation apparatus provided with a touch detection function, and to an image pickup apparatus and a personal digital assistant each including the operation apparatus.

Description of the Related Art

In a conventional information display and input apparatus including a so-called touch panel located on a display unit such as a liquid crystal panel, images of virtual buttons and so on are displayed on a display screen. In this state, a user can input or select information allocated to a certain one of the virtual buttons by touching an area on the touch panel corresponding to a display position of the certain virtual button with a fingertip, a pen tip of a stylus pen or the like. This touch panel has almost plane surface geometry, so that the user input relies on visual guidance. As a consequence, it is inherently difficult to input data accurately because adjacent buttons are not tactually distinguishable. Given the circumstances, there have been proposed user interfaces that can provide tactile guidance.

For example, Japanese Patent Application Laid-Open No. 2011-508935 discloses a user interface, which can provide a user with tactile guidance by inflating a void portion under a surface layer and thereby deforming a particular region of the surface.

However, the related art disclosed in Japanese Patent Application Laid-Open No. 2011-508935 does not take into account a tracing operation (a slide operation) on a touch panel area with the fingertip, the pen tip of the stylus pen, or the like. To be more precise, when a user performs a slide operation with a particular region of the surface deformed, the user cannot perform the slide operation smoothly.

SUMMARY OF THE INVENTION

In view of the above, the present invention provides an operation apparatus which enables a smooth slide operation, and an image pickup apparatus and a personal digital assistant including the operation apparatus.

To achieve the above-described object, the operation apparatus of the present invention includes: a detector capable of detecting a slide operation on a surface of the operation apparatus; a shape variator disposed in a partial region of the surface and including a variable shape portion whose surface shape is deformable; and a controller which controls the shape variator in such a way as to form the shape variable portion into a first shape being the same surface shape as a region other than the partial region or a second region being a surface shape different from the first shape. The controller controls the shape variator in such a way as to form a shape of the variable shape portion into the first shape when the slide operation is detected by the detector.

According to the present invention, it is possible to provide the operation apparatus which enables the smooth slide operation, and the image pickup apparatus and the personal digital assistant including the operation apparatus.

Further features of the present invention will become apparent from the following description of exemplary embodiments with reference to the attached drawings.

BRIEF DESCRIPTION OF THE DRAWINGS

FIG. 4 is a flowchart showing a flow of an input detection process in the first embodiment.

FIG. 5 is a flowchart showing the user input and actions of the touch UI in the first embodiment.

DESCRIPTION OF THE EMBODIMENTS

Preferred embodiments of the present invention will now be described in detail in accordance with the accompanying drawings.

First Embodiment

An operation apparatus (a user interface apparatus) according to a first embodiment of the present invention will be described below with reference to FIGS. 1A to 6C. This embodiment describes a user interface of an image display function of a digital camera as an example of the user interface apparatus.

Figure 1A:
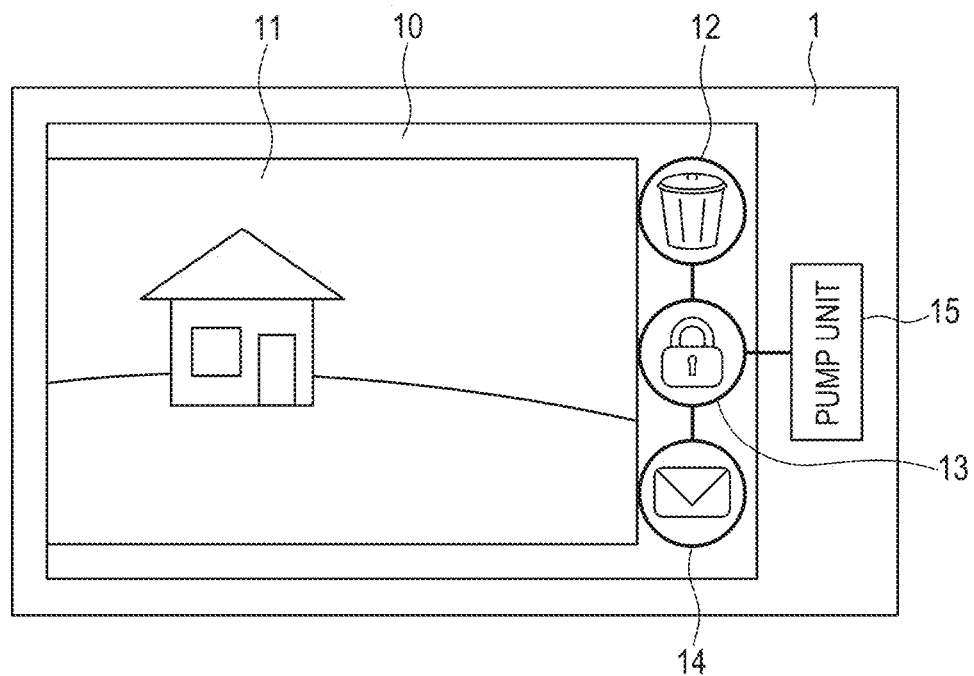
FIG. 1A is a configuration diagram of an operation apparatus of a first embodiment.
Figure 1B:
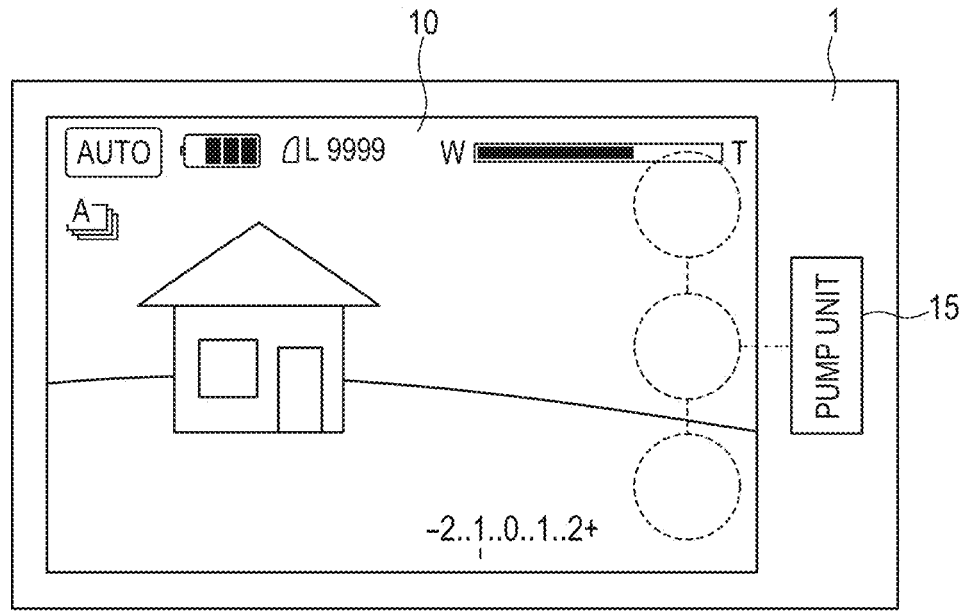
FIG. 1B is a configuration diagram of an operation apparatus of the first embodiment.

FIG. 1A shows a configuration of the user interface apparatus according to the first embodiment of the present invention.

The user interface apparatus of this embodiment is provided to a digital camera (an image pickup apparatus) 1. Moreover, the user interface apparatus represents a user interface of an image display function of the digital camera 1.

The digital camera 1 includes a display screen 10. An image display region 11, a delete button 12, a protect button 13, and a send button 14 are provided on the display screen 10. The display screen 10 is a display unit (hereinafter also referred to as a touch UI), which usually has a plane surface but is also capable of deforming a particular region of the plane surface into a convex shape in order to provide a user with tactile guidance. When the image display function is active in this embodiment, portions of the surface corresponding to the buttons (a partial region including multiple sub-regions) are each deformed into a convex shape by means of the touch UI.

The image display region 11 is a region to display an image in the image display function. Moreover, the image display region 11 can accept input of a touch operation to enlarge a selected location and a slide operation to change an image to be displayed. Here, the slide operation in this specification is deemed to be done when contact by the touch operation with a finger, a touch pen, or the like is detected by the touch UI without interruption and also when the position of detection of the touch changes continuously. To be more precise, the state of bringing the finger and the touch pen, for example, into contact with the surface of the touch UI and into a sliding movement on the surface is defined as the slide operation. Strictly speaking, there may also be a case as described in the following embodiment, where the finger or the touch pen located in the vicinity of the surface of the touch UI can be detected without coming into contact with the surface. Therefore, as mentioned above, the situation where a touch detector (the touch UI) is in the state of detecting the contact and when the position of detection of the contact changes continuously without interruption is deemed that there is the slide operation.

The delete button 12 is an input section which is indicated with a trash can icon, for example, and accepts an operation to delete the selected image. The protect button 13 is an input section which is indicated with a lock icon, for example, and accepts an operation to protect the selected image. The send button 14 is an input section which is indicated with an envelope icon, for example, and accepts an operation to send the selected image to outside by using prescribed communication. Furthermore, the digital camera 1 is provided with a pump unit 15, which is connected to the buttons and is capable of deforming the surface into a convex shape by means of the touch UI.

Meanwhile, in addition to the image display function, the digital camera 1 is provided with various functions including an image shooting function, a setting change function, and so forth. In accordance with the respective functions, the display screen 10 performs operations including various displays or input detections, and deformation into the convex shape by means of the touch UI. In a user interface for the image shooting function shown in FIG. 1B, for example, the entire display screen 10 is used as a live view display region and is operated in a plane state without being subjected to deformation into the convex shape by means of the touch UI. Thus, it is possible to check the composition and the state of the camera while making the maximum use of the display screen 10, and to avoid deterioration in visibility caused by the convex shape.

Figure 2A:
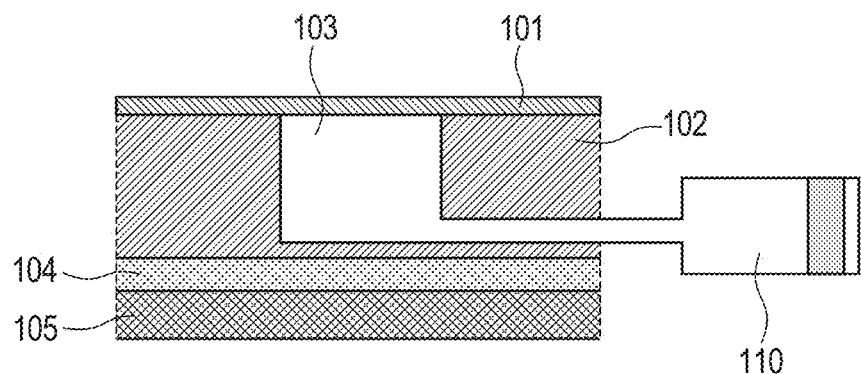
FIG. 2A is a cross-sectional configuration diagram of a touch user interface (touch UI) of each button in the first embodiment.
Figure 2B:
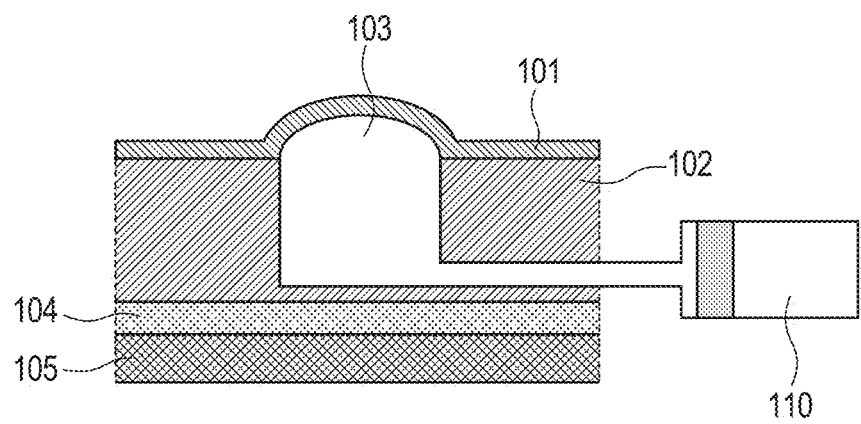
FIG. 2B is a cross-sectional configuration diagram of the touch UI of each button in the first embodiment.

FIGS. 2A and 2B are diagrams showing a cross-sectional configuration of the touch UI of each button. FIG. 2A is a diagram showing a state in which the touch UI is plane and FIG. 2B is a diagram showing a state in which the touch UI is deformed into a convex shape in order to provide a user with tactile guidance.

The touch UI is formed from a transparent sheet 101, a transparent substrate 102, a void portion 103, a touch sensor 104, a display unit 105, and a pump 110.

The transparent sheet (a variable shape portion) 101, the void portion 103, and the pump 110 collectively constitute a shape variator to be explained below. The transparent sheet 101 is made of an elastic (deformable) transparent elastomer material or the like. The transparent sheet 101 is provided on the surface of the display screen 10 and is disposed to cover substantially the entire surface of the display screen 10. Furthermore, the transparent sheet 101 functions to be deformed with inflation of the void portion 103 and to restore to the normal plane state with deflation of the void portion 103. The transparent substrate 102 functions to support the transparent sheet 101 and to at least partially define the void portion 103. The transparent substrate 102 is preferably hard. The void portion 103 functions to hold a fluid and to bring about a deflated volume state (shown in FIG. 2A) (a first state) and an inflated volume state (shown in FIG. 2B) (a second state). Although the fluid is preferably a liquid, the fluid may also be a gas or other materials. Meanwhile, the void portion 103 is connected to the pump 110 through a flow channel. The pump 110 is provided in the pump unit 15 and functions to change the volume of the fluid. To be more precise, the pump 110 inflates the void portion 103 from the deflated volume state to the inflated volume state, and eventually deforms a particular region (a portion above the void portion) of the transparent sheet 101. The change in volume of the void portion 103 is achieved by adding (infusing) and removing (draining) the fluid using the pump 110. Specifically, by controlling the pump 110 and thereby changing the shape of the deformable transparent sheet (the variable shape portion) 101, the shape variator can change the shape of part of the surface of the touch UI in such a way that the surface shape of the region of each button (a partial region of the surface) can be changed from that of the region other than the partial region.

The touch sensor (a detector) 104 is a conventional electrostatic capacitance type touch sensor to be mounted on a display surface of a display apparatus, for example. Here, the touch sensor 104 does not necessarily require the contact with the transparent sheet 101 as a condition of detection, but is configured to detect the user input based on a change in electrostatic capacitance caused by an approach of a fingertip or a pen tip of a stylus pen thereto. Details of the method of detecting the user input will be described later.

The display unit 105 is a conventional liquid crystal display unit, for example, which functions as an interface to the user by adopting a visual method.

As described above, the touch UI can form the convex shape on the display screen 10. By using the touch UI in combination with input graphics to be displayed on the display unit 105, the touch UI functions as a button that can be pressed down by the user while allowing the user to recognize the input position on the touch sensor 104.

The method of detecting the user input with the touch sensor 104 will be described with reference to FIGS. 3A to 3D, and 4.

Figure 3A:
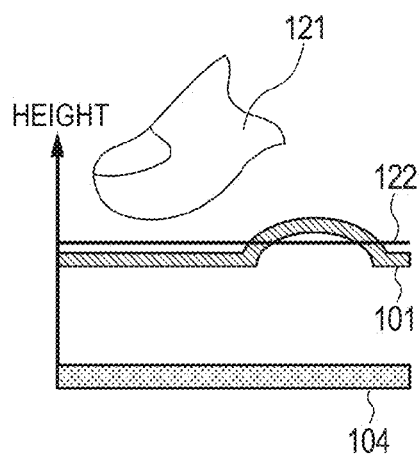
FIG. 3A is a diagram showing a relation between user input and a detection threshold in the first embodiment.
Figure 3C:
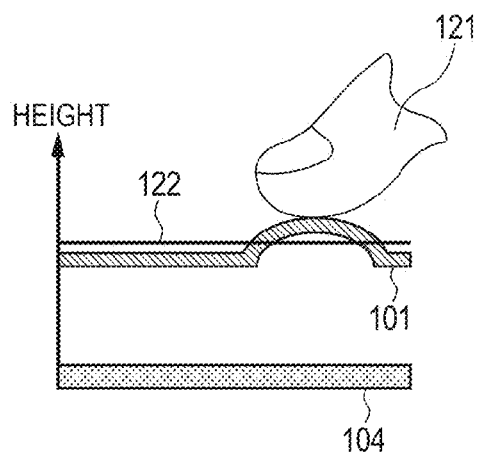
FIG. 3C is a diagram showing the relation between the user input and the detection threshold in the first embodiment.
Figure 3B:
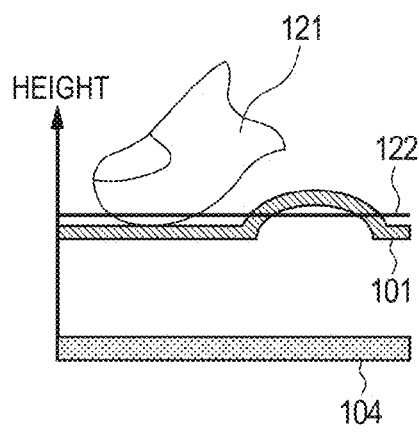
FIG. 3B is a diagram showing the relation between the user input and the detection threshold in the first embodiment.
Figure 3D:
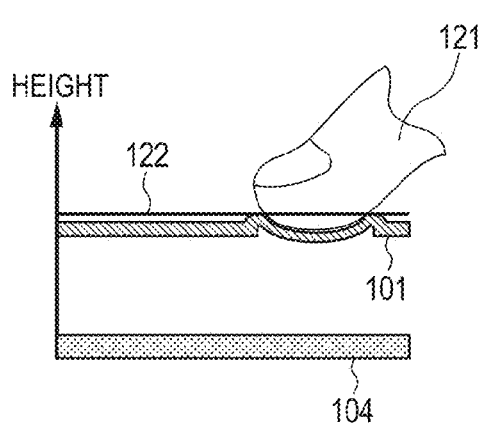
FIG. 3D is a diagram showing the relation between the user input and the detection threshold in the first embodiment.

FIGS. 3A to 3D are diagrams showing relations between the user input and a detection threshold of the touch sensor 104 involving the touch panel and the touch UI, each of which shows a cross-sectional configuration of the touch UI. FIG. 3A shows a state where no user input is detected at a location not deformed into the convex shape, while FIG. 3B shows a state where the user input is detected at the location not deformed into the convex shape. Similarly, FIG. 3C shows a state where no user input is detected at a location deformed into the convex shape, while FIG. 3D shows a state where the user input is detected at the location deformed into the convex shape. Here, the same constituents as those described in FIGS. 2A and 2B will be denoted by the same reference numerals and explanations thereof will be omitted.

A fingertip 121 is a fingertip of the user operating the touch UI, which represents the input operation to the touch UI.

A detection threshold 122 represents a threshold for determining whether or not the user input is detected on the basis of a height of the fingertip obtained from an amount of change in electrostatic capacitance detected by the touch sensor 104.

In the entire region of the touch UI, the detection threshold 122 is set lower than a height of the convex shape and higher than the plane surface. When the height of the fingertip 121 is lower than the detection threshold 122 (closer to the touch sensor 104), it is recognized that the touch UI is operated, and the user input is thus detected.

FIG. 3A shows the state where the touch UI is not touched with the fingertip. In this state, the user input is not detected since the fingertip 121 is located higher than the detection threshold 122. FIG. 3B shows the state where the plane surface of the touch UI is touched with the fingertip. In this state, the touch UI detects the user input since the fingertip 121 is located lower than the detection threshold 122.

FIG. 3C shows the state where the convex shape is touched with the fingertip. In this state, the user input is not detected since the fingertip 121 is in touch with the transparent sheet 101 but is located higher than the detection threshold 122. FIG. 3D shows the state where the convex shape is pressed down with the fingertip 121. In this state, the touch UI detects the user input since the fingertip 121 is located lower than the detection threshold 122. In other words, the user input is detected for the first time in the region provided with the convex shape by performing the operation to press the convex shape down. Thus, the user can gain an operation feeling similar to that with a conventional button.

Next, a user input determination process will be described by using a flowchart of FIG. 4.

In S401, it is determined whether or not the height of the fingertip 121 is lower than the detection threshold 122. The process proceeds to S402 when the height is lower than the detection threshold 122 while the process proceeds to S407 when the height is higher than the detection threshold 122.

In S402, it is determined whether or not a user input position is constant while the operation continues. The process proceeds to S403 when the user input position is constant while the process proceeds to S406 when the user input position is not constant.

In S403, it is determined whether or not the user input position coincides with a convex shape position. The process proceeds to S404 when the user input position coincides with the convex shape position while the process proceeds to S405 when the user input position does not coincide with the convex shape position.

In S404, the user input is determined to be a press down operation and the process is terminated.

In S405 the user input is determined to be a touch operation and the process is terminated.

In S406, the user input is determined to be a slide operation and the process is terminated.

In S407, no user input is determined to be present and the process is terminated.

The user input can be appropriately determined in accordance with the above-described process flow.

Next, a deformation action by the touch UI (a controller) in the case of the determination as the slide operation will be described by using a flowchart of FIG. 5.

In S501, it is determined whether or not the user input is the slide operation. The process proceeds to S502 when the user input is the slide operation while the process proceeds to S503 when the user input is not the slide operation.

In S502, formation of the convex shape is cancelled by operating the pump unit 15, and the process is terminated.

In S503, the convex shape is formed by operating the pump unit 15, and the process is terminated.

According to the above-described flow, it is possible to cancel the convex shape upon detection of the slide operation, and thus to reestablish the normal plane state.

Effects of cancelling the convex shape upon recognition of the slide operation and thereby reestablishing the normal plane state will be described below by using FIGS. 6A, 6B, and 6C.

Figure 6A:
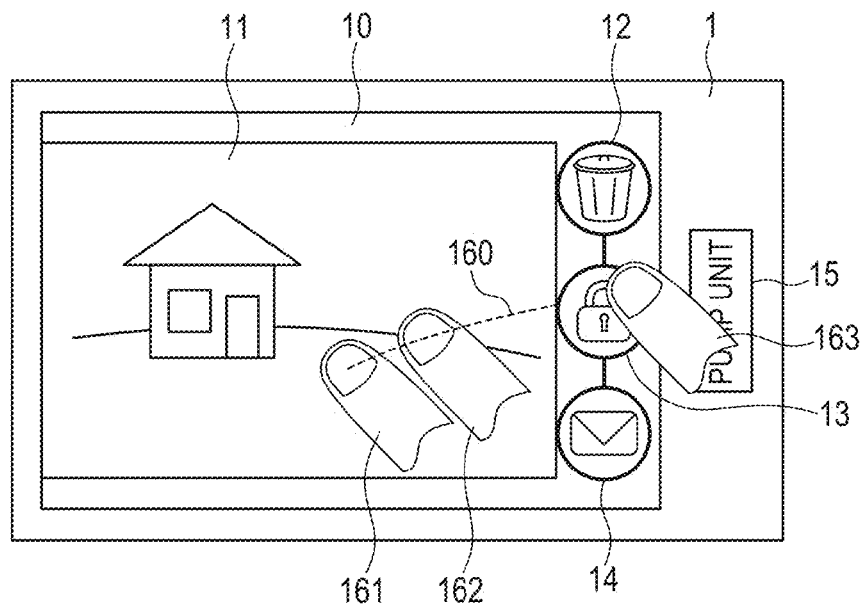
FIG. 6A is a diagram showing the user input and the actions of the touch UI in the first embodiment.
Figure 6B:
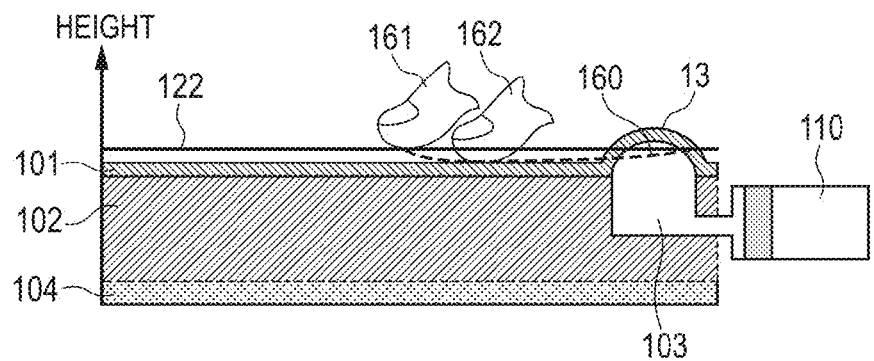
FIG. 6B is a diagram showing the user input and the actions of the touch UI in the first embodiment.
Figure 6C:
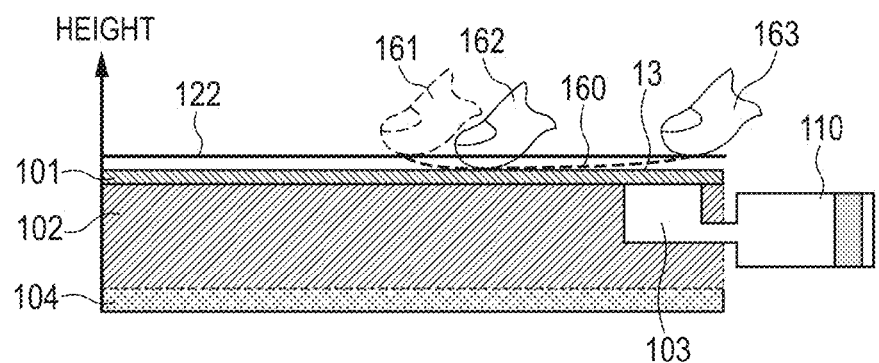
FIG. 6C is a diagram showing the user input and the actions of the touch UI in the first embodiment.

FIGS. 6A, 6B, and 6C are diagrams showing operations of the user for switching an image to be displayed by the slide operation. Here, the same constituents as those in FIGS. 1A to 3D are denoted by the same reference numerals and explanation thereof will be omitted.

FIG. 6A is a top plan view showing a series of the slide operation.

A track 160 is a track of the series of the slide operation, and represents an operation of a movement from a fingertip 161 to a fingertip 163 via a fingertip 162 while passing though the position of the protect button 13.

The fingertip 161 is a fingertip located at time T1, which represents a position at which the touch sensor 104 recognizes the user input.

The fingertip 162 is a fingertip located at time T2, which represents a position at which the touch sensor 104 recognizes the user input as the slide operation. Upon detection of the user input as the slide operation at the time T2, the buttons 12 to 14 are deformed into the plane state by using the pump unit 15.

The fingertip 163 is a fingertip located at time T3, which represents a position at which the touch sensor 104 recognizes that no user input is present. Upon detection of the absence of the user input at the time T3, each of the buttons 12 to 14 is deformed into the convex shape by using the pump unit 15.

FIG. 6B is a view showing a cross section of the user interface apparatus from the time T1 to the time T2, in which each of the buttons 12 to 14 is in the convex shape. If the convex shape is retained as it is, the track 160 will interfere with the convex shape of the button 13 and the fingertip will collide with the convex shape. Thus, it will be not possible to perform the slide operation comfortably.

Meanwhile, FIG. 6C is a view showing a cross section of the user interface apparatus from the time T2 to the time T3, in which each of the buttons 12 to 14 is in the plane state. Since the button 13 is in the plane state, it is possible to perform the slide operation comfortably without causing the track 160 to interfere with the convex shape.

As shown above, when the user input is recognized as the slide operation at the time T2, each of the buttons 12 to 14 is deformed into the plane state by using the pump unit 15. As a consequence, the protect button 13 to be passed through during the slide operation is in the plane state at the time of the passage. Thus, the user can comfortably perform the slide operation without recognizing the convex shape.

In the meantime, although the case of recognition of the user input as the slide operation has been described as the sole condition for changing the convex shape into the plane state, it is also possible to set several other conditions in addition to the slide operation.

For example, the convex shape may be changed into the plane state only when the slide operation is recognized and a distance between the user input position and the convex shape becomes close to or falls within a given threshold. In addition, the threshold for the change into the plane state may vary depending on the operating speed.

Meanwhile, the convex shape may be changed into the plane state only when the slide operation is recognized and there is the corresponding convex shape ahead in the direction of the operation.

Furthermore, in the configuration where each of the buttons is provided with the pump 110, respectively, so that it is possible to control deformation of the buttons independently of one another, then only the convex shape corresponding to the condition for changing the convex shape into the plane state may be changed into the plane state.

By setting the above-mentioned conditions, it is possible to reduce the number of times to change the convex shape into the plane state. Thus, it is possible to reduce the number of times of operations of the pump 110 and the transparent sheet 101, and thus to extend the product life.

Note that this embodiment has described the digital camera as the example of the user interface apparatus, and the image display function of the digital camera as the example. However, the present invention is not limited to these examples. The present invention is also applicable to other apparatuses and functions as long as such an apparatus or a function pertains to an interface configured to accept user input. Examples of such an interface include personal digital assistants (PDAs) such as a tablet terminal, operation panels of various apparatuses, and the like.

Furthermore, this embodiment has described the case where the display unit is plane. However, the present invention is not limited only to this configuration. Similar effects can also be achieved in a user interface apparatus in which deformable members are provided on a curved surface.

In the meantime, although this embodiment has described the example in which the fluid is infused into the void portion to realize the structure of changing the shape of the touch UI, the present invention is not limited only to this configuration. Any other configurations are acceptable as long as such a configuration can provide the user with tactile guidance by changing the shape of the surface. Furthermore, although the convex shape has been described as the example of the change in shape, the present invention is not limited only to this configuration. Similar effects can be achieved by a configuration adopting a concave shape or a concavo-convex shape, and a configuration to change a friction coefficient of the surface by use of an electrical characteristic.

Meanwhile, this embodiment has described the example of the configuration to detect the user input by determining the touch operation, the slide operation, and the press down operation only by use of the electrostatic capacitance type touch sensor. However, the present invention is not limited only to this configuration. For instance, a piezoelectric sensor may be provided at the void portion in addition to the electrostatic capacitance type touch sensor, and the press down operation by the user may be detected by allowing the piezoelectric sensor to detect a change in pressure inside the void portion caused by the user pressing down the convex shape. In addition, when the press down operation is detected with a separate sensor such as the piezoelectric sensor, a change of a sensor to be pressed down may be ignored or a function of the sensor to be pressed down may be disabled upon detection of the slide operation so as to prevent an erroneous operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-114977, filed Jun. 5, 2015, which is hereby incorporated by reference herein in its entirety.

What is claimed is:

1. An operation apparatus comprising:
   a surface to which input of an operation is performed, the surface including a variable tactile portion whose tactile is variable;
   a detector configured to detect input of a slide operation to the surface; and
   a controller configured to control the tactile of the variable tactile portion such that the variable tactile portion is formed into one of a first tactile as a tactile of a region of the surface other than the variable tactile portion and a second tactile different from the first tactile,
   wherein the controller is configured to control, in a case where the detector detects the input of the slide operation, the tactile of the variable tactile portion such that the variable tactile portion is formed into the first tactile before the detected slide operation reaches the variable tactile portion.

2. The operation apparatus according to claim 1, wherein the variable tactile portion with the second tactile has a convex shape protruding from the region of the surface other than the variable tactile portion.

3. The operation apparatus according to claim 1, wherein the controller is configured to control, in a case where a distance between a position where the detector detects the input of the slide operation and the variable tactile portion falls within a range, the tactile of the variable tactile portion such that the variable tactile portion is formed into the first tactile.

4. The operation apparatus according to claim 3, wherein the controller is configured to control the tactile of the variable tactile portion such that the variable tactile portion, a distance of which from the position the detector detects the input of the slide operation falls within the range, is formed into the first tactile.

5. The operation apparatus according to claim 1, wherein the controller is configured to control the tactile of the variable tactile portion such that the variable tactile portion is formed into the first tactile in a case where the variable tactile portion is located ahead in a direction of the slide operation detected by the detector.

6. The operation apparatus according to claim 5, wherein the controller is configured to control the tactile of the variable tactile portion such that at least one of the variable tactile portion located ahead in the direction of the slide operation is formed into the first tactile.

7. The operation apparatus according to claim 1, wherein the detector includes a touch sensor.

8. An image pickup apparatus comprising:
an operation apparatus which performs an operation in accordance with a function of the image pickup apparatus, wherein the operation apparatus comprises:
a surface to which input of an operation is performed, the surface including a variable tactile portion whose tactile is variable;
a detector configured to detect input of a slide operation to the surface; and
a controller configured to control the tactile of the variable tactile portion such that the variable tactile portion is formed into one of a first tactile as a tactile of a region of the surface other than the variable tactile portion and a second tactile different from the first tactile,
wherein the controller is configured to control, in a case where the detector detects the input of the slide operation, the tactile of the variable tactile portion such that the variable tactile portion is formed into the first tactile before the detected slide operation reaches the variable tactile portion.

9. A personal digital assistant comprising:
an operation apparatus which performs an operation in accordance with a function of the personal digital assistant, wherein the operation apparatus comprises:
a surface to which input of an operation is performed, the surface including a variable tactile portion whose tactile is variable;
a detector configured to detect input of a slide operation to the surface; and
a controller configured to control the tactile of the variable tactile portion such that the variable tactile portion is formed into one of a first tactile as a tactile of a region of the surface other than the variable tactile portion and a second tactile different from the first tactile,
wherein the controller is configured to control, in a case where the detector detects the input of the slide operation, the tactile of the variable tactile portion such that the variable tactile portion is formed into the first tactile before the detected slide operation reaches the variable tactile portion.

10. An operation apparatus comprising:
a surface to which input of an operation is performed, the surface including a variable tactile portion whose tactile is variable between a first tactile and a second tactile different from the first tactile;
a detector configured to detect input of a slide operation to the surface; and
a controller configured to control, in a case where the detector detects the input of the slide operation, the variable tactile portion such that the tactile of the variable tactile portion is changed to the first tactile from the second tactile before the detected slide operation reaches the variable tactile portion.

11. The operation apparatus according to claim 10, wherein the variable tactile portion with the second tactile has a convex shape protruding from a region of the surface other than the variable tactile portion.

12. The operation apparatus according to claim 10, wherein the controller is configured to control, in a case where a distance between a position where the detector detects the input of the slide operation and the variable tactile portion falls within a range, the variable tactile portion such that the tactile of the variable tactile portion is changed to the first tactile from the second tactile.

13. The operation apparatus according to claim 12, wherein
the controller is configured to control the variable tactile portion such that the tactile of the variable tactile portion, a distance of which from the position the detector detects the input of the slide operation falls within the range, is changed to the first tactile from the second tactile.

14. The operation apparatus according to claim 10, wherein the controller is configured to control the variable tactile portion such that the tactile of the variable tactile portion is changed to the first tactile from the second tactile in a case where the variable tactile portion is located ahead in a direction of the slide operation detected by the detector.

15. The operation apparatus according to claim 14, wherein
the controller is configured to control the variable tactile portion such that the tactile of at least one of the variable tactile portion located ahead in the direction of the slide operation is changed to the first tactile from the second tactile.

16. The operation apparatus according to claim 10, wherein the detector includes a touch sensor.

17. An image pickup apparatus comprising:
a surface to which input of an operation is performed, the surface including a variable tactile portion whose tactile is variable between a first tactile and a second tactile different from the first tactile;
a detector configured to detect input of a slide operation to the surface; and
a controller configured to control, in a case where the detector detects the input of the slide operation, the variable tactile portion such that the tactile of the variable tactile portion is changed to the first tactile from the second tactile before the detected slide operation reaches the variable tactile portion.

18. A terminal comprising:
a surface to which input of an operation is performed, the surface including a variable tactile portion whose tactile is variable between a first tactile and a second tactile different from the first tactile;
a detector configured to detect input of a slide operation to the surface; and
a controller configured to control, in a case where the detector detects the input of the slide operation, the variable tactile portion such that the tactile of the variable tactile portion is changed to the first tactile from the second tactile before the detected slide operation reaches the variable tactile portion.

19. The terminal according to claim 18, wherein the terminal is a tablet terminal.

* * * * *